United States Patent
Chen

(10) Patent No.: US 10,350,982 B2
(45) Date of Patent: Jul. 16, 2019

(54) VEHICLE BODY

(71) Applicant: ZHEJIANG QIYE SCOOTER CO., LTD. CORPORATION CHINA, Jinhua, Zhejiang (CN)

(72) Inventor: Dongrui Chen, Zhejiang (CN)

(73) Assignee: ZHEJIANG QIYE SCOOTER CO., LTD. CORPORATION CHINA, Jinhua, Zhejiang (CN)

( * ) Notice: Subject to any disclaimer, the term of this patent is extended or adjusted under 35 U.S.C. 154(b) by 0 days.

(21) Appl. No.: 15/708,210

(22) Filed: Sep. 19, 2017

(65) Prior Publication Data

US 2018/0079290 A1    Mar. 22, 2018

(30) Foreign Application Priority Data

Sep. 20, 2016  (CN) ..................... 2016 2 1065351 U

(51) Int. Cl.
*B60K 5/12* (2006.01)
*B62K 11/04* (2006.01)
*B60K 5/00* (2006.01)
*B62M 7/02* (2006.01)

(52) U.S. Cl.
CPC ............ *B60K 5/1208* (2013.01); *B62K 11/04* (2013.01); *B60K 2005/003* (2013.01); *B62K 2201/00* (2013.01); *B62M 7/02* (2013.01)

(58) Field of Classification Search
CPC ............ B60K 5/1208; B60K 2005/003; B62K 11/04; B62M 7/02
See application file for complete search history.

(56) References Cited

U.S. PATENT DOCUMENTS

| 4,373,602 | A | * | 2/1983 | Tomita | ..................... B62M 7/04 180/227 |
|---|---|---|---|---|---|
| 4,723,620 | A | * | 2/1988 | Ono | ..................... B62J 11/005 180/219 |
| 6,053,272 | A | * | 4/2000 | Koyanagi | ............ B60K 5/1208 180/299 |
| 2005/0205328 | A1 | * | 9/2005 | Inaoka | .................. B62K 11/10 180/228 |
| 2006/0197304 | A1 | * | 9/2006 | Ishikawa | ................ B62K 11/06 280/281.1 |
| 2008/0196960 | A1 | * | 8/2008 | Brown | .................. B62K 11/04 180/227 |

(Continued)

*Primary Examiner* — Brian L Swenson
(74) *Attorney, Agent, or Firm* — Yue (Robert) Xu; Apex Attorneys at Law, LLP

(57) ABSTRACT

A vehicle body includes a vehicle frame and an engine assembly, and further includes an intermediate supporting frame connected between the vehicle frame and the engine assembly. A first cushioning device is provided between the intermediate supporting frame and the vehicle frame. In the application of the vehicle body, since the first cushioning device is provided, the first cushioning device can effectively reduce vibration transmitted from the intermediate supporting frame when the vibration is transmitted to the intermediate supporting frame during the vibration of the engine assembly, and the vibration received by the vehicle frame may be much less than the vibration transmitted from the intermediate supporting frame, thus the vehicle frame can be effectively prevented vibrating heavily. Therefore, the heavy vibration of the vehicle body can be effectively reduced by means of the vehicle body.

8 Claims, 4 Drawing Sheets

(56) References Cited

U.S. PATENT DOCUMENTS

| | | | | |
|---|---|---|---|---|
| 2009/0166115 A1* | 7/2009 | Mizutani | ............. | B62H 1/04 |
| | | | | 180/68.3 |
| 2009/0229908 A1* | 9/2009 | Ito | ............. | B62K 19/30 |
| | | | | 180/312 |
| 2009/0266637 A1* | 10/2009 | Miyashiro | ............. | B62K 11/04 |
| | | | | 180/219 |
| 2010/0101886 A1* | 4/2010 | Ishibe | ............. | B62K 11/04 |
| | | | | 180/296 |
| 2010/0320723 A1* | 12/2010 | Kashiwai | ............. | B62K 11/04 |
| | | | | 280/283 |
| 2011/0226543 A1* | 9/2011 | Kashiwai | ............. | B62K 11/02 |
| | | | | 180/299 |
| 2016/0159428 A1* | 6/2016 | Woltz | ............. | B62K 25/28 |
| | | | | 280/284 |
| 2017/0320533 A1* | 11/2017 | Hayashi | ............. | B62K 11/12 |

* cited by examiner

VEHICLE BODY

CROSS-REFERENCE TO RELATED APPLICATIONS

The present application claims the priority to Chinese patent application No. 201621065351.1 titled "VEHICLE BODY", filed with the Chinese State Intellectual Property Office on Sep. 20, 2016, the entire disclosure of which is incorporated herein by reference.

FIELD

The present application relates to the technical field of vehicles, and, particularly, to a vehicle body.

BACKGROUND

Currently, motor vehicles are common modes of transport. A motor vehicle generally includes a vehicle frame and an engine arranged on the vehicle frame. The vehicle frame generally includes a main frame, a front fork and a rear fork, with the front fork and the rear fork being arranged on a front end and a rear end of the main frame respectively.

In the case that the engine vibrates heavily in the travelling, the vehicle frame would vibrate heavily, and a driving cab would also vibrate heavily. Thus, driving experience in the driving cab is degraded.

In summary, an issue to be addressed presently by the person skilled in the art is to effectively overcome heavy vibration of a vehicle frame of a vehicle body.

SUMMARY

In view of the above, a vehicle body is provided according to the present application, which can effectively reduce the heavy vibration of a vehicle frame of a vehicle body.

The following technical solutions are provided according to the present application.

A vehicle body is provided, which includes a vehicle frame and an engine assembly, and further includes an intermediate supporting frame connected between the vehicle frame and the engine assembly, and a first cushioning device is provided between the intermediate supporting frame and the vehicle frame.

Preferably, one of the intermediate supporting frame and the vehicle frame is provided with a supporting post and the other one of the intermediate supporting frame and the vehicle frame is provided with a mounting hole sleeved on the supporting post, and the first cushioning device is a cushioning sleeve sleeved on the supporting post and arranged between the supporting post and the mounting hole.

Preferably, each of two ends of the cushioning sleeve is provided with a stuck projection extending outwardly to be stuck at two ends of the mounting hole.

Preferably, the supporting post is arranged horizontally.

Preferably, the vehicle frame includes a main frame and a rear fork, and the first cushioning device is provided between the main frame and the intermediate supporting frame and between the rear fork and the intermediate supporting frame.

Preferably, the intermediate supporting frame includes a main body and a separate body, wherein the separate body has one end fixed relative to the main body and another end extending upwardly or downwardly and provided with a connecting portion, and each of two ends of the main body is provided with a connecting portion.

Preferably, the main body is provided to fit against an upper surface of the engine assembly.

Preferably, a second cushioning device is provided between the intermediate supporting frame and the engine assembly.

Preferably, the main body is fixed to the separate body by welding.

The vehicle body provided according to the present application includes a vehicle frame, an engine assembly and an intermediate supporting frame. The vehicle frame is generally used for mounting various components of the vehicle body. The intermediate supporting frame is connected between the vehicle frame and the engine assembly, that is, the engine assembly is securely mounted on the vehicle frame indirectly by means of the intermediate supporting frame. A first cushioning device is provided between the intermediate supporting frame and the vehicle frame. It is to be noted that the first cushioning device being provided between the intermediate supporting frame and the vehicle frame means that the first cushioning device is provided at a connection position.

According to the above-described technical solutions, it may be known that in assembling the vehicle body, the engine assembly is secured to the vehicle frame by means of the intermediate supporting frame, and in connecting the intermediate supporting frame to the vehicle frame, the first cushioning device is provided. In the application of the vehicle body, since the first cushioning device is provided, the first cushioning device can effectively reduce vibration transmitted from the intermediate supporting frame when the vibration is transmitted to the intermediate supporting frame during vibration of the engine assembly, and the vibration received by the vehicle frame may be much less than the vibration transmitted from the intermediate supporting frame, thus the vehicle frame can be effectively prevented from vibrating heavily. Therefore, the heavy vibration of the vehicle body can be effectively reduced by the vehicle body.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

The drawings are marked as follows.

Figure 1:
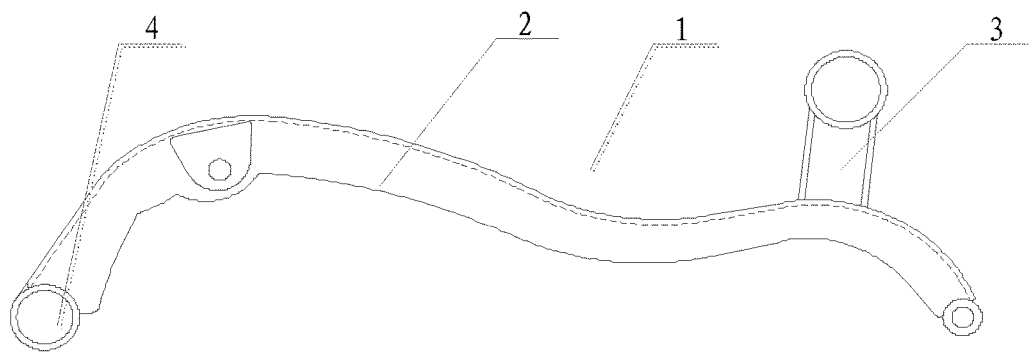
FIG. 1 is a schematic front view showing the structure of an intermediate supporting frame according to an embodiment of the present application.

| | |
|---|---|
| intermediate supporting frame 1, | main body 2, |
| separate body 3, | mounting hole 4, |
| vehicle frame 5, | engine assembly 6, |
| first cushioning device 7, | supporting post 8, |
| rear fork 9 | stuck projection 10. |

DETAILED DESCRIPTION

A vehicle body is provided by the embodiments of the present application, which effectively reduce the heavy vibration of a vehicle frame 5 of the vehicle body.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 2:
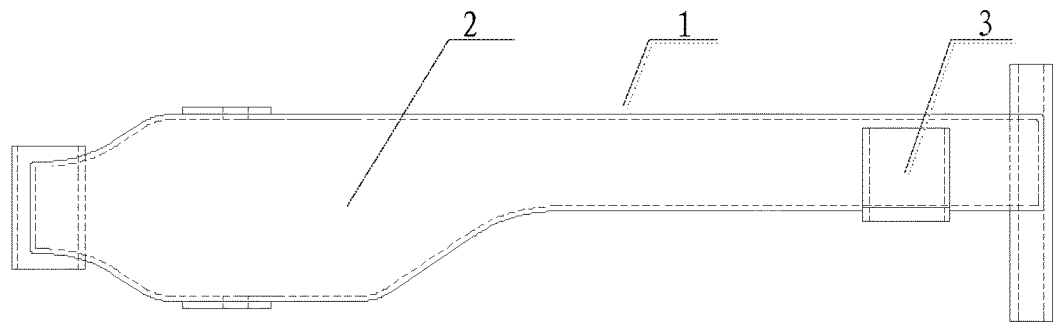
FIG. 2 is a schematic top view of an intermediate supporting frame according to an embodiment of the present application.
Figure 3:
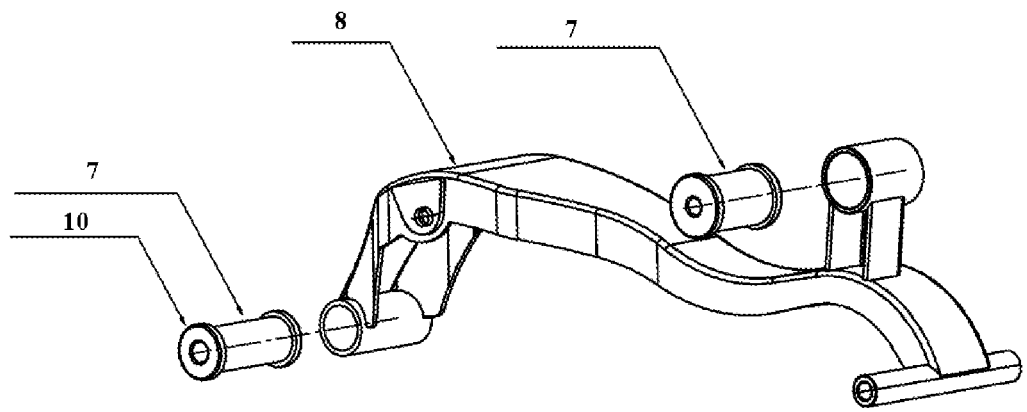
FIG. 3 is a schematic view of mounting a first cushioning device and a stuck projection on the intermediate supporting frame according to the embodiment of the present application.
Figure 4:
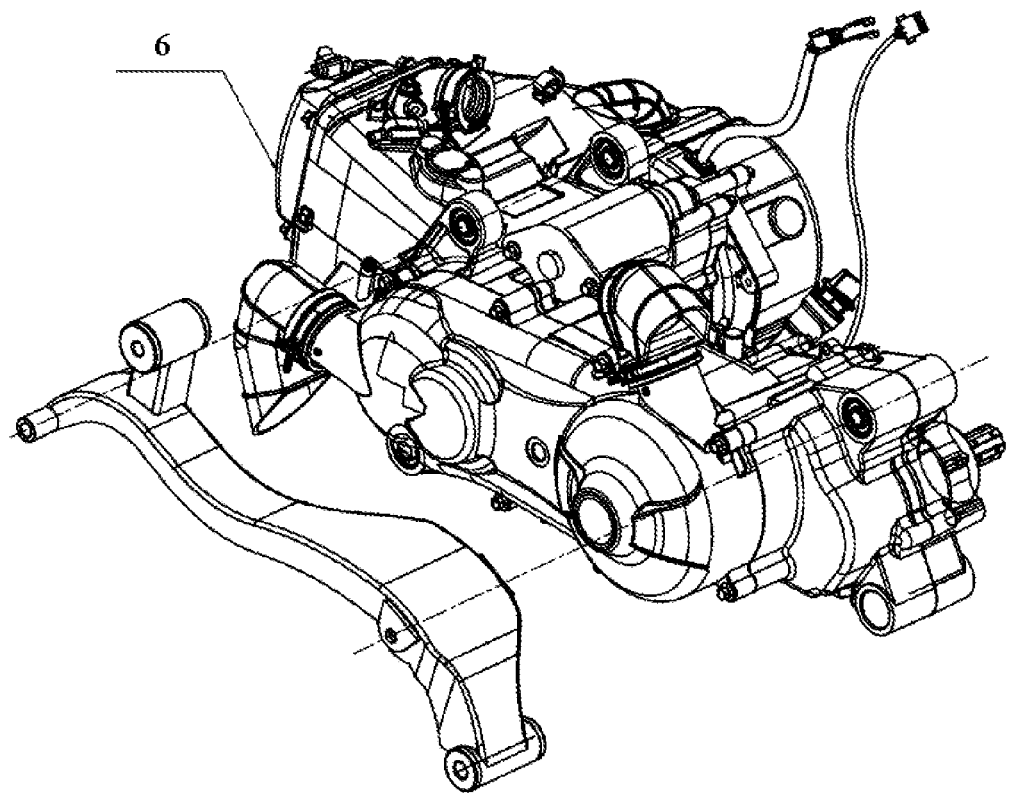
FIG. 4 is a schematic view of mounting an engine assembly on the intermediate supporting frame according to the embodiment of the present application.
Figure 5:
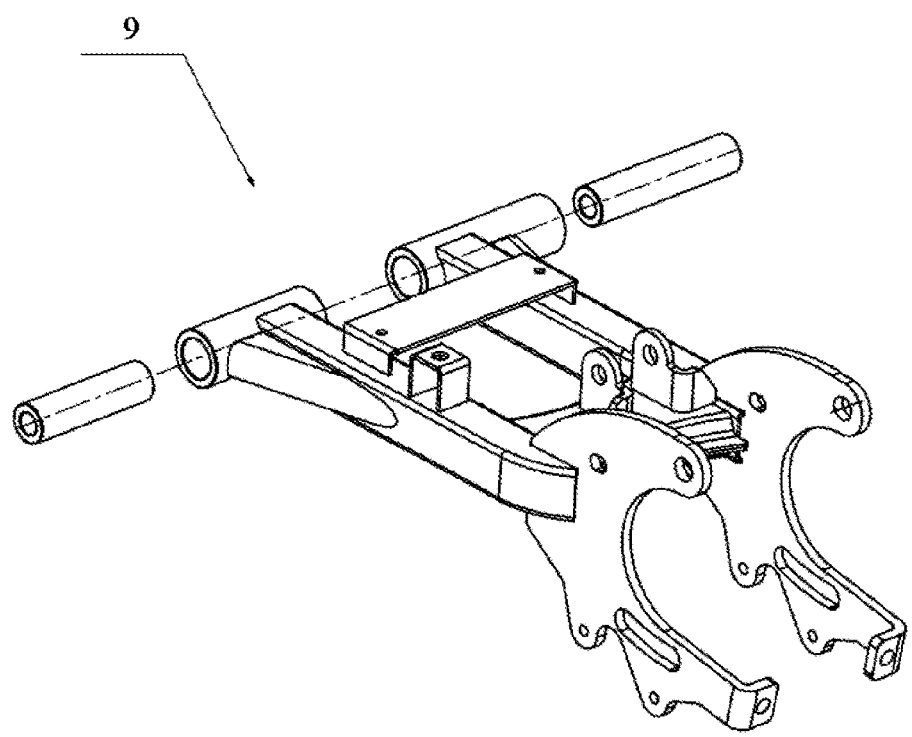
FIG. 5 is a schematic view of a rear fork according to the embodiment of the present application.
Figure 6:
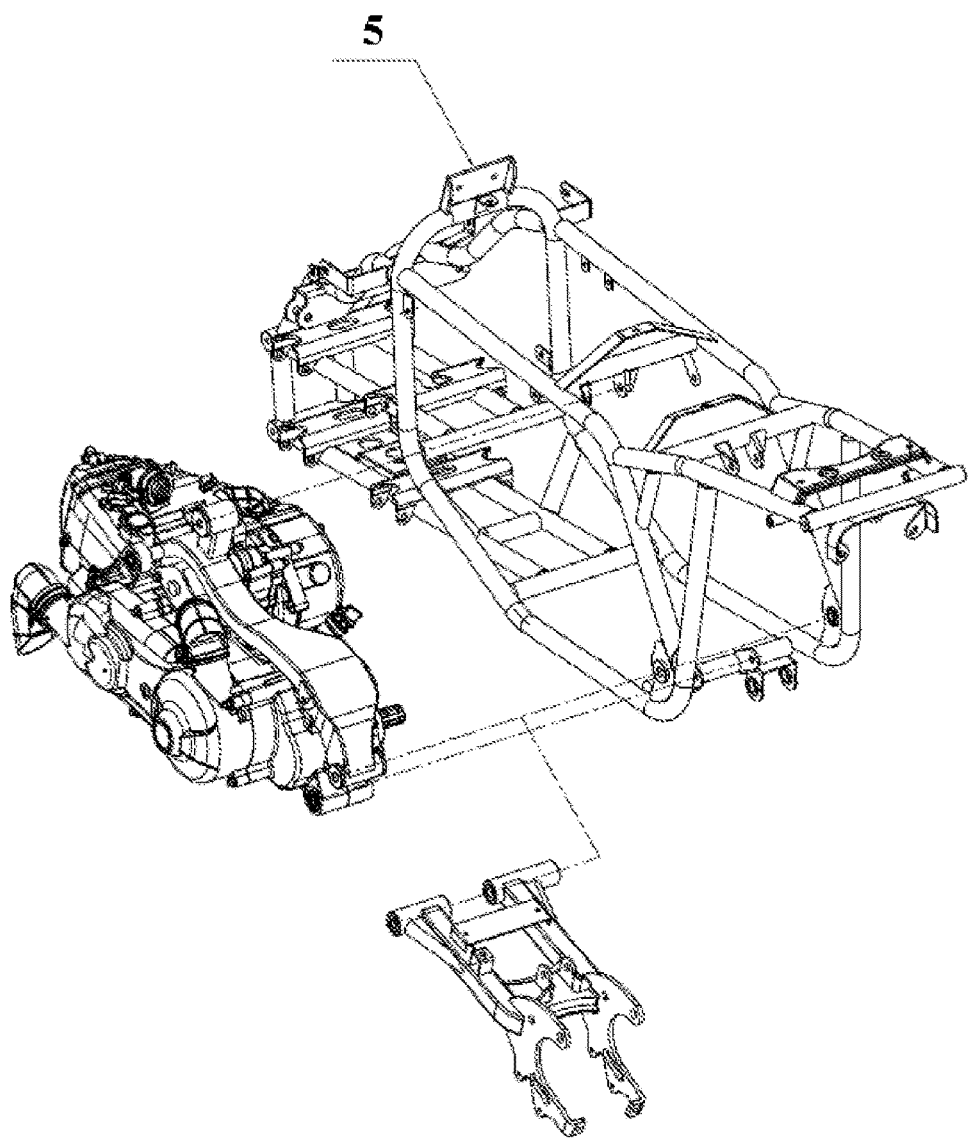
FIG. 6 is a schematic view of mounting the engine assembly and the rear fork on a vehicle frame according to the embodiment of the present application.

Reference is made to FIGS. 1 to 2. FIG. 1 is a schematic front view showing the structure of an intermediate supporting frame according to an embodiment of the present application, and FIG. 2 is a schematic top view of an intermediate supporting frame according to an embodiment of the present application.

In an embodiment, a vehicle body is provided. Specifically, the vehicle body includes a vehicle frame 5, an engine assembly 6, and an intermediate supporting frame 1.

The vehicle frame 5 is generally used for mounting various components of the vehicle body, such as a suspension system and a carriage. A common vehicle frame generally includes a main frame, and a front fork and a rear fork 9 respectively provided on front and rear sides of the main frame. The main frame is generally formed by welding a steel pipe member into a frame shape.

The engine assembly 6 includes an engine core component and auxiliary accessories for use with the engine core component. The auxiliary accessories and the engine core component are integrally packaged. It is to be noted herein that the specific structure of the engine assembly 6 can be referred to the conventional technology, which will not be described in detail here.

The intermediate supporting frame 1 is connected between the vehicle frame 5 and the engine assembly 6, that is, the engine assembly 6 is securely mounted on the vehicle frame 5 indirectly by means of the intermediate supporting frame 1. A first cushioning device 7 is provided between the intermediate supporting frame 1 and the vehicle frame 5. It is to be noted that the first cushioning device 7 being provided between the intermediate supporting frame 1 and the vehicle frame 5 means that the first cushioning device 7 is provided at a connection position of the intermediate supporting frame 1 and the vehicle frame 5. Specifically, an elastic cushioning device may be used for achieving indirect connection, or, a cushion and other connecting member may be used for securing, in which the cushion is arranged in a securing direction of the connecting member, so as to allow a cushioning space to be presented in the securing direction.

In this embodiment, in assembling the vehicle body, the engine assembly 6 is secured to the vehicle frame 5 by means of the intermediate supporting frame 1, and the first cushioning device 7 is provided for connecting the intermediate supporting frame 1 to the vehicle frame 5. In the application of the vehicle body, since the first cushioning device 7 is provided, the first cushioning device 7 can effectively reduce vibration transmitted from the intermediate supporting frame 1 when vibration is transmitted to the intermediate supporting frame 1 during vibration of the engine assembly 6, and the vibration received by the vehicle frame 5 is much less than the vibration transmitted from the intermediate supporting frame 1, thus the vehicle frame 5 can be effectively prevented vibrating heavily. Therefore, the heavy vibration of the vehicle frame 5 of the vehicle body can be effectively reduced by the vehicle body.

Further, the intermediate supporting frame 1 and the engine assembly 6 can be directly connected to each other rigidly, however, since the better the cushioning effect is, the poorer the stability is, a second cushioning device may be provided between the intermediate supporting frame 1 and the engine assembly 6 accordingly. Reference may be made to the arrangement of the first cushioning device 7 for the arrangement of the second cushioning device, that is, the arrangement of the second cushioning device may be implemented as an elastic cushioning device to achieve an indirect connection, or, a cushion is provided, which is not described repeatedly here. The second cushioning device can effectively reduce vibration transmitted from the engine assembly 6 to the intermediate supporting frame 1. Moreover, since the first cushioning device 7 and the second cushioning device are arranged separately, it effectively avoids an insufficient strength of the cushioning device, which may otherwise cause a relatively low service life of the cushioning device.

Further, the first cushioning device 7 as described above may be an elastic cushioning device for connecting and securing, or may be a cushion. For making the first cushioning device 7 have a simple structure and a low cost, the first cushioning device 7 is preferably embodied as a cushion herein, and the specific arrangement is as follows: one of the intermediate supporting frame 1 and the vehicle frame 5 is provided with a supporting post 8 and the other one of the supporting post 8 and the mounting hole is provided with a mounting hole 4 sleeved on the supporting post 8; and the first cushioning device 7 is embodied as a cushioning sleeve, and the cushioning sleeve is sleeved on the supporting post 8 and is arranged between the supporting post 8 and the mounting hole 4, such that the cushioning sleeve would be pre-deformed for reducing a force in the case that one of the supporting post 8 and the mounting hole 4 moves in a radial direction at a high acceleration, thus avoiding a small acceleration of the other one of the supporting post 8 and the mounting hole 4 in the case of making respond. It is to be noted that the supporting post 8 can be arranged horizontally or vertically. For a human body, the vibration in a vertical direction brings more discomfort than the vibration in a horizontal direction. Therefore, it is preferable to arrange the supporting post 8 horizontally which may further provide a large supporting force in the vertical direction.

When arranging the supporting post 8 and the mounting hole 4, the supporting post 8 can be rigidly fixed to the mounting hole 4 in an axial direction, or the cushion may be provided therein. Specifically, each of two ends of the cushion sleeve may be provided with a stuck projection extending outwards to be stuck at two ends of the mounting hole 4, which can not only prevent the cushion sleeve from moving in the axial direction and further prevent the detachment of the cushion sleeve, but also prevent a stuck shoulder member or a stuck shoulder portion located at each of two ends of the supporting post 8 from directly abutting against a corresponding end of the mounting hole. The stuck projection is located between the stuck shoulder portion and the end of the mounting hole, so as to have certain cushion effect in the axial direction.

As described above, the vehicle frame 5 generally includes a main frame, and a front fork and a rear fork 9 respectively provided on the front and rear sides of the main frame. In order to prevent a relatively large supporting force from being subjected on the main frame, the first cushioning device 7 can be provided between the rear fork and the intermediate supporting frame 1 and between the main frame and the intermediate supporting frame 1.

Further, in order to facilitate arranging the intermediate supporting frame 1 and arranging respective connecting portions of the intermediate supporting frame 1 appropriately, the intermediate supporting frame 1 includes a main body 2 and a separate body 3 fixed relative to the main body 2. The separate body 3 has one end fixed relative to the main body 2, and another end extending upwardly or downwardly and being provided with a connecting portion. Each of two ends of the main body 2 is provided with a connecting portion, and the connecting portion is a connecting portion for being connected to the engine assembly 6, or a connecting portion for being connected to the vehicle frame 5. It is to be noted that a part of the connecting portions is connected to the engine assembly 6 and the other part of the connecting portions is connected to the vehicle frame 5. Specifically, one end of two ends of the main body 2 may be connected to the engine assembly 6, and the other end of the two ends of the main body 2 may be connected to the vehicle frame 5, then the separate body 3 extending upwardly may be provided for being connected to the vehicle frame 5, and the separate body 3 extending downwardly is further provided for being connected to the engine assembly 6. It is to be noted that the main body 2 and the separate body 3 may be integrally formed, and may also be fixed by welding, or may be connected and fixed by a bolt. Further, in order to avoid oversizing, it is preferable that the main body 2 is arranged to fit against an upper surface of the engine assembly 6, that is, a direction of bending deformation of the main body 2 can follow a direction of bending deformation of an upper surface of the engine assembly 6.

The above embodiments are described in a progressive manner. Each of the embodiments is mainly focused on describing its differences from other embodiments, and references may be made among these embodiments with respect to the same or similar portions among these embodiments.

The description of the embodiments disclosed herein enables the person skilled in the art to implement or use the present application. Various modifications to the embodiments will be apparent to the person skilled in the art, and the general principle herein can be implemented in other embodiments without departing from the spirit or scope of the present application. Therefore, the present application is not limited to the embodiments described herein, but should be in accordance with the widest scope consistent with the principle and novel features disclosed herein.

The invention claimed is:

1. A vehicle body, comprising:
a vehicle frame,
an engine assembly, and
an intermediate supporting frame connected between the vehicle frame and the engine assembly,
wherein a first cushioning device is provided between the intermediate supporting frame and the vehicle frame,
wherein a second cushioning device is provided between the intermediate supporting frame and the engine assembly,
wherein one of the intermediate supporting frame and the vehicle frame is provided with a supporting post and the other one of the intermediate supporting frame and the vehicle frame is provided with a mounting hole sleeved on the supporting post, and the first cushioning device is a cushioning sleeve sleeved on the supporting post and arranged between the supporting post and the mounting hole,
wherein each of two ends of the cushioning sleeve is provided with a stuck projection extending outwardly to be stuck at two ends of the mounting hole,
wherein the vehicle frame comprises a main frame and a rear fork, and the first cushioning device is provided between the main frame and the intermediate supporting frame and between the rear fork and the intermediate supporting frame.

2. The vehicle body according to claim 1, wherein the supporting post is arranged horizontally.

3. The vehicle body according to claim 2, wherein the vehicle frame comprises a main frame and a rear fork, and the first cushioning device is provided between the main frame and the intermediate supporting frame and between the rear fork and the intermediate supporting frame.

4. The vehicle body according to claim 1, wherein the vehicle frame comprises a main frame and a rear fork, and the first cushioning device is provided between the main frame and the intermediate supporting frame and between the rear fork and the intermediate supporting frame.

5. The vehicle body according to claim 1, wherein the vehicle frame comprises a main frame and a rear fork, and the first cushioning device is provided between the main frame and the intermediate supporting frame and between the rear fork and the intermediate supporting frame.

6. The vehicle body according to claim 1, wherein the intermediate supporting frame comprises a main body and a separate body, and the separate body has one end fixed relative to the main body and another end extending upwardly or downwardly and provided with a connecting portion, and each of two ends of the main body is provided with a connecting portion.

7. The vehicle body according to claim 6, wherein the main body is provided to fit against an upper surface of the engine assembly.

8. The vehicle body according to claim 6, wherein the main body is fixed to the separate body by welding.

* * * * *